(12) United States Patent
Lippincott et al.

(10) Patent No.: US 7,356,197 B2
(45) Date of Patent: Apr. 8, 2008

(54) VARIABLE TAP FILTER ARCHITECTURE FOR IMAGE PROCESSING

(75) Inventors: Louis A. Lippincott, Los Altos, CA (US); Shashikiran H. Tadas, Tempe, AZ (US)

(73) Assignee: Intel Corporation, Santa Clara, CA (US)

( * ) Notice: Subject to any disclaimer, the term of this patent is extended or adjusted under 35 U.S.C. 154(b) by 864 days.

(21) Appl. No.: 10/611,071

(22) Filed: Jun. 30, 2003

(65) Prior Publication Data

US 2004/0264797 A1 Dec. 30, 2004

(51) Int. Cl.
*G06K 9/40* (2006.01)

(52) U.S. Cl. .................. 382/265; 382/261; 382/262; 382/263; 382/264

(58) Field of Classification Search ......... 382/260–266
See application file for complete search history.

(56) References Cited

U.S. PATENT DOCUMENTS

| | | | |
|---|---|---|---|
| 5,485,412 A * | 1/1996 | Sarkkinen et al. | 708/308 |
| 5,977,947 A | 11/1999 | Potu | |
| 6,199,084 B1 * | 3/2001 | Wiseman | 708/304 |
| 6,556,193 B1 | 4/2003 | Auld et al. | |
| 6,983,076 B2 * | 1/2006 | Curry et al. | 382/260 |
| 2001/0045988 A1 | 11/2001 | Yamauchi et al. | |
| 2002/0141654 A1 * | 10/2002 | Rosales | 382/261 |

FOREIGN PATENT DOCUMENTS

| | | |
|---|---|---|
| EP | 0651351 A1 | 10/1994 |
| EP | 0807922 A1 | 5/1997 |

* cited by examiner

*Primary Examiner*—Matthew C. Bella
*Assistant Examiner*—Wes Tucker
(74) *Attorney, Agent, or Firm*—Blakely, Sokoloff, Taylor & Zafman LLP

(57) ABSTRACT

An embodiment of the present invention is an apparatus to filter two-dimensional (2-D) data. A first filter processes two-dimensional (2-D) data in a block of pixels in a first dimension for a plurality of filter sizes. The block has a swath. A register file stores the 2-D data based on programmable information. A second filter filters the stored 2-D data in a second dimension to generate filter outputs in one of static and dynamic modes based on the programmable information. The static mode leaves the filter outputs fixed for the swath and the dynamic mode selects the filter outputs on a pixel basis. The filter outputs include first and second filter outputs.

30 Claims, 7 Drawing Sheets

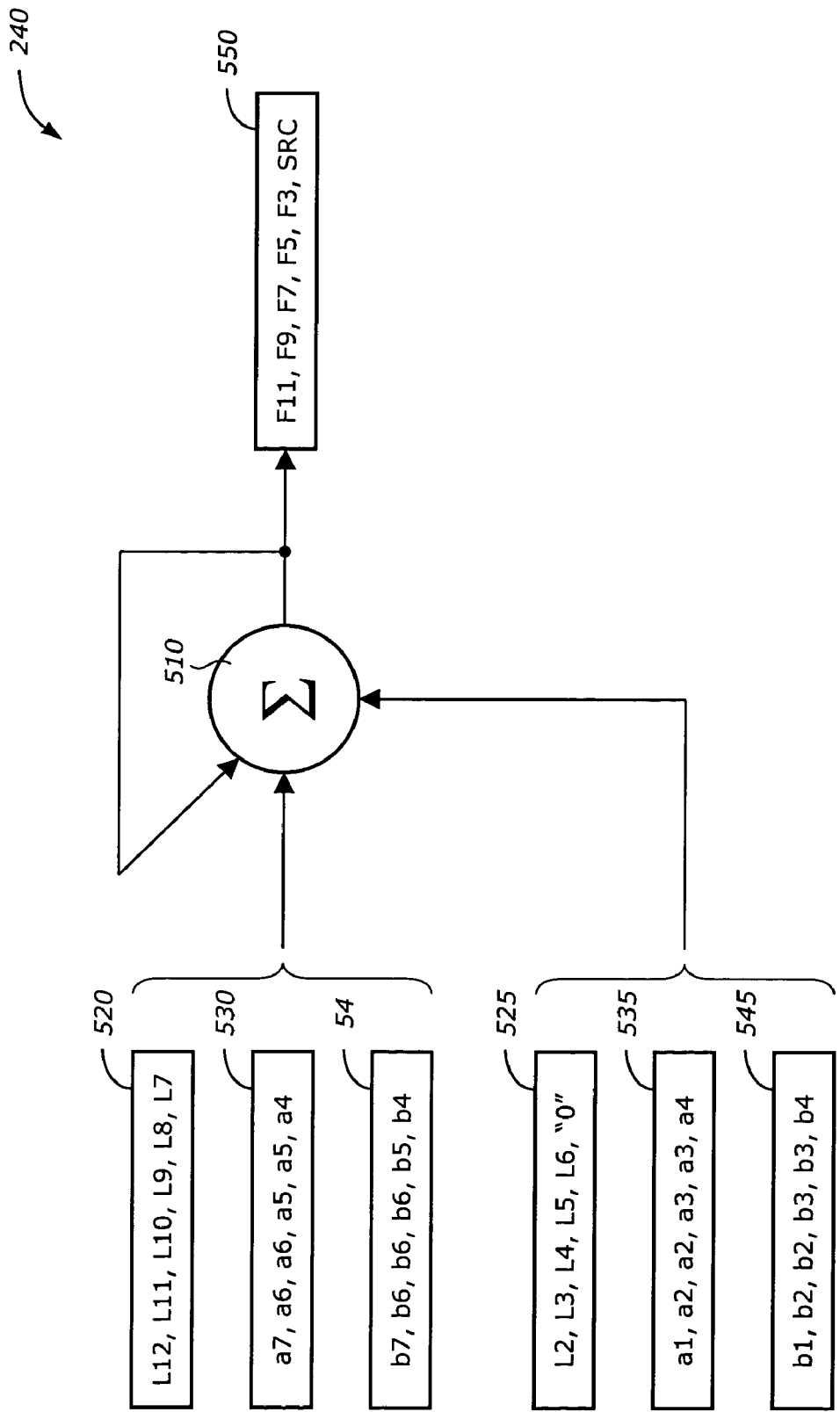

VARIABLE TAP FILTER ARCHITECTURE FOR IMAGE PROCESSING

BACKGROUND

1. Field of the Invention

Embodiments of the invention relate to the field of image processing, and more specifically, to filter architecture for image processing.

2. Description of Related Art

Image processing has many important applications in multimedia communication, machine vision, pattern recognition, and artificial intelligence. In a typical application, an image or a cinematic sequence of images is processed in a processing chain including pre-processing, segmentation, and high level interpretation. The pre-processing phase tends to be context independent and includes operations to enhance the image or to reduce the amount of data for subsequent stages. One such common operation is the filtering operation.

Existing techniques for image filtering have a number of drawbacks. First, the processing speed is not fast enough to process images at or near real-time speed. Second, they tend to be inflexible and may not accommodate various filter sizes. Third, there is little programmability support to configure parameters for the filtering operation. Fourth, there is lack of support for integration with other elements in a typical image processor.

BRIEF DESCRIPTION OF THE DRAWINGS

The invention may best be understood by referring to the following description and accompanying drawings that are used to illustrate embodiments of the invention. In the drawings:

FIG. 5 is a diagram illustrating a first filter according to one embodiment of the invention.

DESCRIPTION

An embodiment of the present invention is an apparatus to filter two-dimensional (2-D) data. A first filter processes two-dimensional (2-D) data in a block of pixels in a first dimension for a plurality of filter sizes. The block has a swath. A register file stores the 2-D data based on programmable information. A second filter filters the stored 2-D data in a second dimension to generate filter outputs in one of static and dynamic modes based on the programmable information. The static mode leaves the filter outputs fixed for the swath and the dynamic mode selects the filter outputs on a pixel basis. The filter outputs include first and second filter outputs.

In the following description, numerous specific details are set forth. However, it is understood that embodiments of the invention may be practiced without these specific details. In other instances, well-known circuits, structures, and techniques have not been shown in order not to obscure the understanding of this description.

Figure 1:
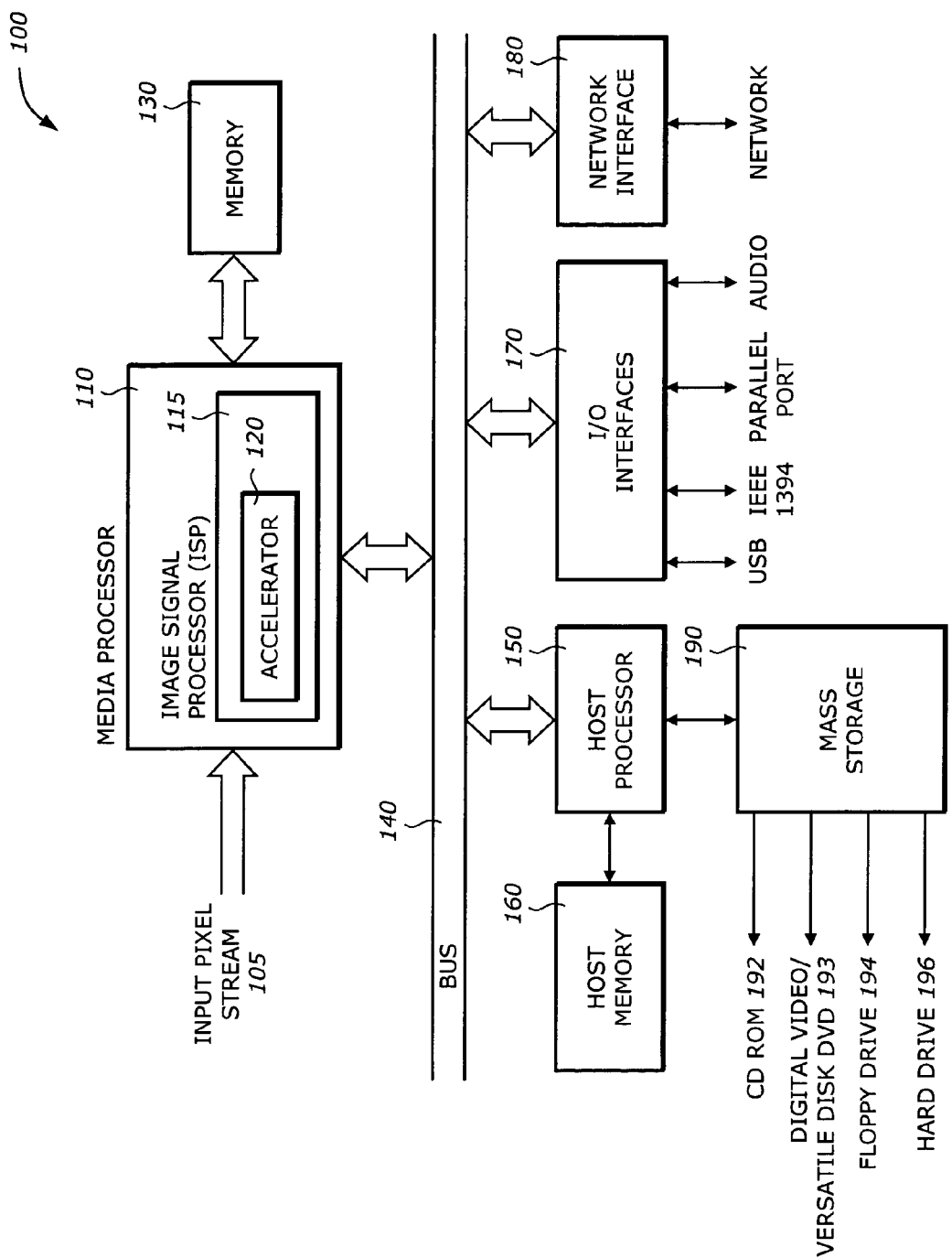
FIG. 1 is a diagram illustrating a system in which one embodiment of the invention can be practiced.

FIG. 1 is a diagram illustrating a system 100 in which one embodiment of the invention can be practiced. The system 100 includes an input pixel stream 105, a media processor 110, a memory 130, a bus 140, a host processor 150, a host memory 160, input/output (I/O) interfaces 170, a network interface 180, and a mass storage 190.

The input pixel stream 105 represents image data as provided by image sensors or other processing elements. The image data may come from a digital copier, scanner, camera, printer, or any other multi-function peripherals. The media processor 110 is a high-performance processor optimized for image processing and other media operations. The media processor 110 implements a data-driven, shared register architecture. In one embodiment, the media processor 110 has a data path of 16 bits and a core frequency in excess of 260 MHz. It includes a number of image signal processors such as the image signal processor (ISP) 115. These ISPs are connected to each other through programmable ports. The ISP 115 includes a number of processing elements (PE's), general purpose registers (GPR's), internal random access memory (RAM), memory command handler (MCH) to streamline accesses to the local data memory, and a number of hardware accelerators. Each ISP is optimized for a particular task and the hardware accelerator in the ISP provides that optimization. There are three types of hardware accelerators: (1) 2-D variable tap filters, (2) bi-level text encoder/decoder, and (3) Huffman encoder/decoder. An accelerator 120 is used as a 2-D variable tap filter (VTF).

The memory 130 provides high-speed data storage. It may be implemented as a dual data rate (DDR) synchronous dynamic random access memory (SDRAM). In one embodiment, the DDR memory ports provide more than 1 Gbyte/sec data transfer bandwidth. The bus 140 provides interface between the media processor 110 and a host system. In one embodiment, the bus 140 is a Peripheral Component Interconnect (PCI) bus operating a 33/66 MHz frequency.

The host processor 150 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture.

The host memory 160 stores system code and data. The host memory 160 is typically implemented with dynamic random access memory (DRAM) or static random access memory (SRAM). The host memory 160 may include program code or code segments implementing one embodiment of the invention. The image processing program in the host memory 160 may contain instructions that, when executed by the processor 150, causes the processor 150 to perform the tasks or operations including downloading microcode, register configuration, register initialization, interrupt servicing, etc. to the media processor 110. The host processor 150 may also provide interface for uploading and downloading image data.

The I/O interfaces 170 provide a number of interfaces to I/O devices or bus interfaces such as Universal Serial Bus (USB), Institute of Electrical and Electronics Engineers (IEEE) 1394, parallel port, audio (e.g., phone), etc. The network interface 180 provides interface to a network. The network any suitable network such as an Internet, intranet, extranet, wireless fidelity (Wi-Fi), local area network (LAN), wide area network (WAN), etc.

The mass storage device 190 stores archive information such as code, programs, files, data, databases, applications, and operating systems. The mass storage device 190 may include compact disk (CD) ROM 192, a digital video/versatile disc (DVD) 193, floppy drive 194, and hard drive 196, and any other magnetic or optic storage devices such as tape drive, tape library, redundant arrays of inexpensive disks (RAIDs), etc. The mass storage device 190 provides a mechanism to read machine-accessible media. The machine-accessible media may contain computer readable program code to perform tasks as described in the following.

Figure 2:
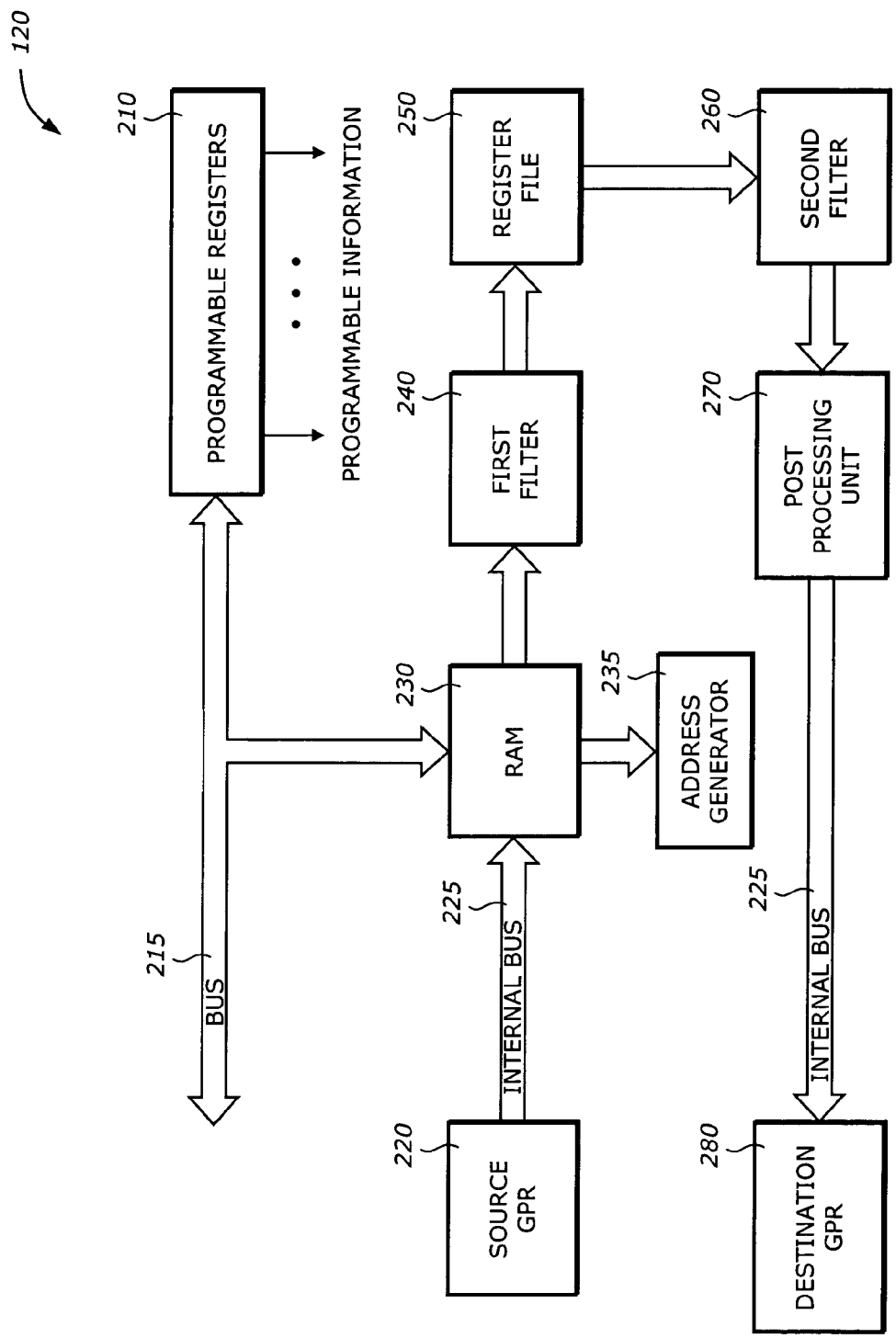
FIG. 2 is a diagram illustrating an accelerator according to one embodiment of the invention.

FIG. 2 is a diagram illustrating an accelerator 120 according to one embodiment of the invention. The accelerator 120 includes a bus 215, a set of programmable registers 210, a source GPR 220, an internal bus 225, a RAM 230, a first filter 240, a register file 250, a second filter 260, a post processing unit 270, and a destination GPR 280.

The accelerator 120 may be implemented as a high-speed smoothing triangular 2-D filter with linear coefficients. It can perform 2-D 3×3 (F3), 5×5 (F5), 7×7 (F7), 9×9 (F9), and 11×11 (F11) filtering. As is known by one skilled in the art, other filter sizes may also be accommodated.

The bus 215 connects all the major units in the media processor to the accelerator 120. It allows the host processor 150 to program the programmable registers 210 and access the RAM 230. The set of programmable registers 210 includes a number of registers that contain programmable information to set up and configure the operations of the accelerator 120.

The source GPR 220 is one of the general purpose registers used to provide input to the RAM 230 via the internal bus 225. The RAM 230 is a buffer memory to receive the image data from the GPR 240 and store in a column-wise manner. As is known in one skilled on the art, the data may also be stored in a row-wise manner. The RAM 230 is accessible via the bus 215. It has two identical memory banks, RAM0 and RAM1, to increase bandwidth. Each memory bank is 1K×16 and has its own address which is used by the bus 215 for selection during read/write operation. The read and write operations in the RAM 230 is controlled by the priority setting in the programmable registers 210. The address generator 235 provides proper addressing to the RAM 230 to provide data to the first filter 240.

The first filter, or the Stage I filter, 240 processes the two-dimensional (2-D) data in a block of pixels in a first dimension for various filter sizes. The block has a width and a swath. In one embodiment, the first dimension is the horizontal dimension. The register file 250 stores the 2-D data based on programmable information provided by the set of programmable registers 210. For example, it provides the stored data to the second filter 260 depending on the bank select bits in the programmable information. Also, the order in which the set of data stored in the register file 250 sent to the second filter depends on whether Luminance or Chrominance/Red Green Blue (RGB) set of data is being processed.

The second filter, or the Stage II filter, 260 filters the stored 2-D data in a second dimension to generate filter outputs in one of static and dynamic modes based on the programmable information. In essence, the first and second filters 250 and 260 implement separable filters to process each dimension separately. In one embodiment, the second dimension is the vertical dimension. The filter outputs include first and second filter outputs. The second filter 260 has two identical units to generate the first and second filter outputs simultaneously. One unit is for a lower order filter and the other for a higher order filter. In one embodiment, the lower and higher order filter outputs are 19 bits and are sent to the post processing unit 270 for further processing. The static mode leaves the filter outputs fixed for the swath and the dynamic mode selecting the filter outputs on a pixel basis.

The post processing unit 270 performs a post processing operation on at least one of the first and second filter outputs according to the programmable information. In one embodiment, the post processing operation may be any one of a normalization, a blending operation, a data appending operation, etc. The destination GPR 280 receives the data processed by the post processing unit 270 through the internal bus 225.

Figure 3:
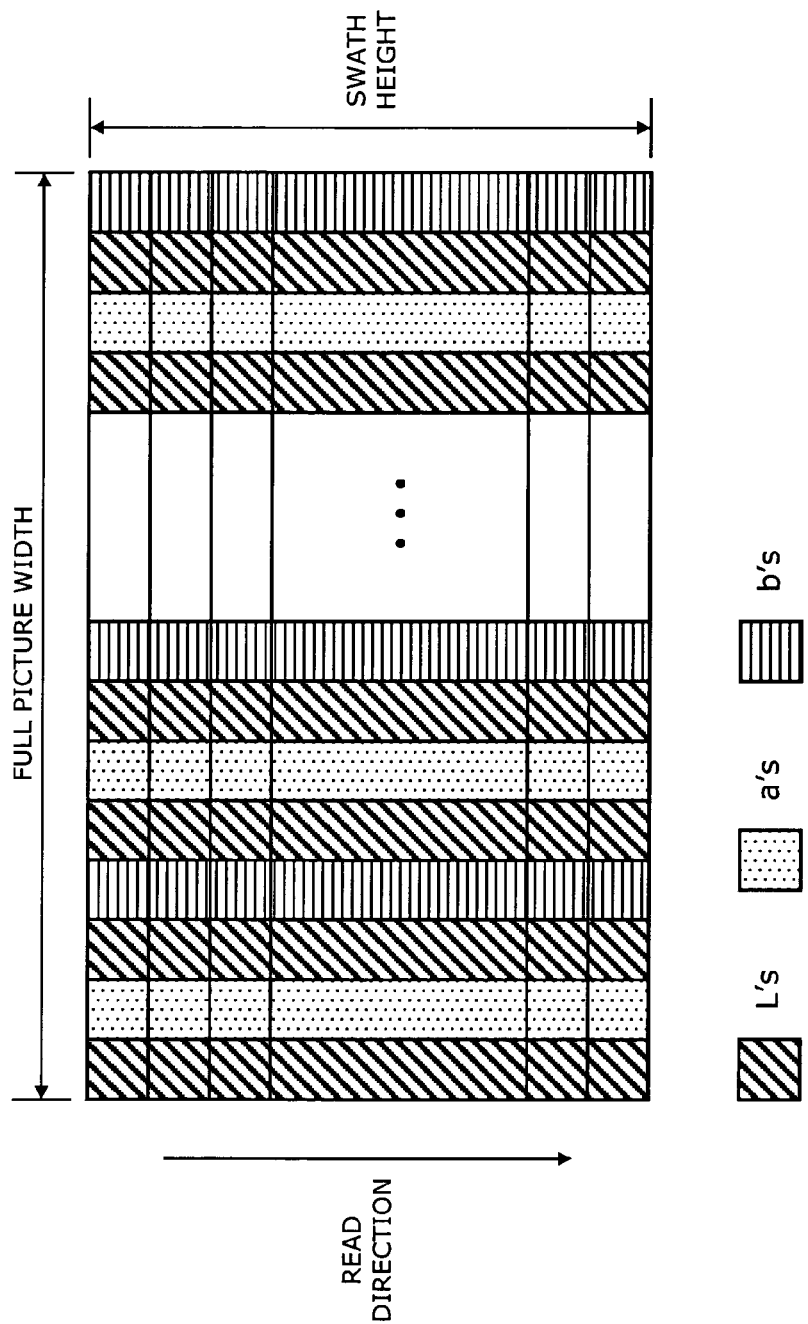
FIG. 3 is a diagram illustrating a block of pixels according to one embodiment of the invention.

FIG. 3 is a diagram illustrating a block of pixels according to one embodiment of the invention. The block of pixels shows a block having a width W and a swath height H. The data are read in the column direction.

While the pixel data are input in the column format, the order of the different components of the pixel is configurable. The input configurations may support single column or four column format. In addition, it may also support single component, two component, and three component types. Let L be the chrominance data, R and G are the red and green components, a and b are the sub-sampled components of the chrominance data. The input configuration may be as shown in Table 1A.

TABLE 1A

|  | Single Column | Four Column |
| --- | --- | --- |
| Single component | L, L, L | L, L, L, L |
| Two component | R, G, R, G | Not Supported |
| Three component | L, a, L, b | LaLb, LaLb |

The block of pixels shows the alternating column data in the Four Column and Three Component format LaLb, LaLb, . . . , LaLb. The swath height is programmable from 1 to 64.

In case of Single column Single component mode, regardless of the filter being implemented, the filter starts from the $6^{th}$ column, when data up to $11^{th}$ column is available. So, the output is $[x-10]*[y-10]$ size, where $x*y$ is the original size.

In case of Single column Dual component mode, regardless of the filter being implemented, the filter starts from the $11^{th}$ column, when data up to $21^{st}$ column is available. So, the output is $[x-20]*[y-10]$ size, where $x*y$ is the original size.

In case of Single column Three-component mode, regardless of the filter being implemented, the filter starts from the $13^{th}$ column, when data up to $23^{rd}$ column is available. So, the first set of data corresponding to $13^{th}$ column comes out when 23 columns are available, and this is given by $[x-22]$. This equation holds good only during the initial condition for the first column of output. But, after that the next set of output data corresponding to $14^{th}$ column will come out when data up to $26^{th}$ column is available. And further, another column of output data will come out corresponding to the filter formed at column $15^{th}$ without any more data being written into accelerator. So, the output pattern from this onwards is $[w-23]*[y-10]$ size, where $x*y$ is the original size and $w=[x-x \bmod 2]$. The equation states that 22 columns are chopped off, as 12 columns are chopped off in the beginning because the filter cannot start till $13^{th}$ column for lack of data and 10 columns are chopped off at the end.

In case of Four column Single component mode, regardless of the filter being implemented, the filter starts from the $6^{th}$ column, when data up to $11^{th}$ column is available. But, since the input is of Four column type, the column number can increment in 4's. Therefore, the filter starts at $6^{th}$ column when 12 columns are available. So, the output is [w−10]*[y−10] size, where x*y is the original size and w=[x−x mod 4].

In case of Four column Three component mode, regardless of the filter being implemented, the filter starts from the $13^{th}$ column, when data up to $23^{rd}$ column is available. But, since the input is of Four column type, the column number can increment in 4's. Therefore, the filter starts at $13^{th}$ column when 24 columns are available. So, the output is [w−22]*[y−10] size, where x*y is the original size and w=[x−x mod 4].

A summary of this description is given in Table 1B below:

TABLE 1B

| Modes | Output pixels/swath | Approx. Latency for the 1st pixel | Latency for the 1st pixel, with Y = 64 |
|---|---|---|---|
| 1 col, 1 comp. | [x − 10] * [y − 10] | 11 * y + 96 | 800 |
| 1 col, 2 comp. | [x − 20] * [y − 10] | 21 * y + 96 | 1440 |
| 1 col, 3 comp. | [(x − x mod 2) − 23] * [y − 10] | 23 * y + 96 | 1568 |
| 4 col, 1 comp. | [(x − x mod 4) − 10] * [y − 10] | 12 * y + 96 | 864 |
| 4 col, 3 comp. | [(x − x mod 4) − 23] * [y − 10] | 24 * y + 96 | 1632 |

Figure 4A:
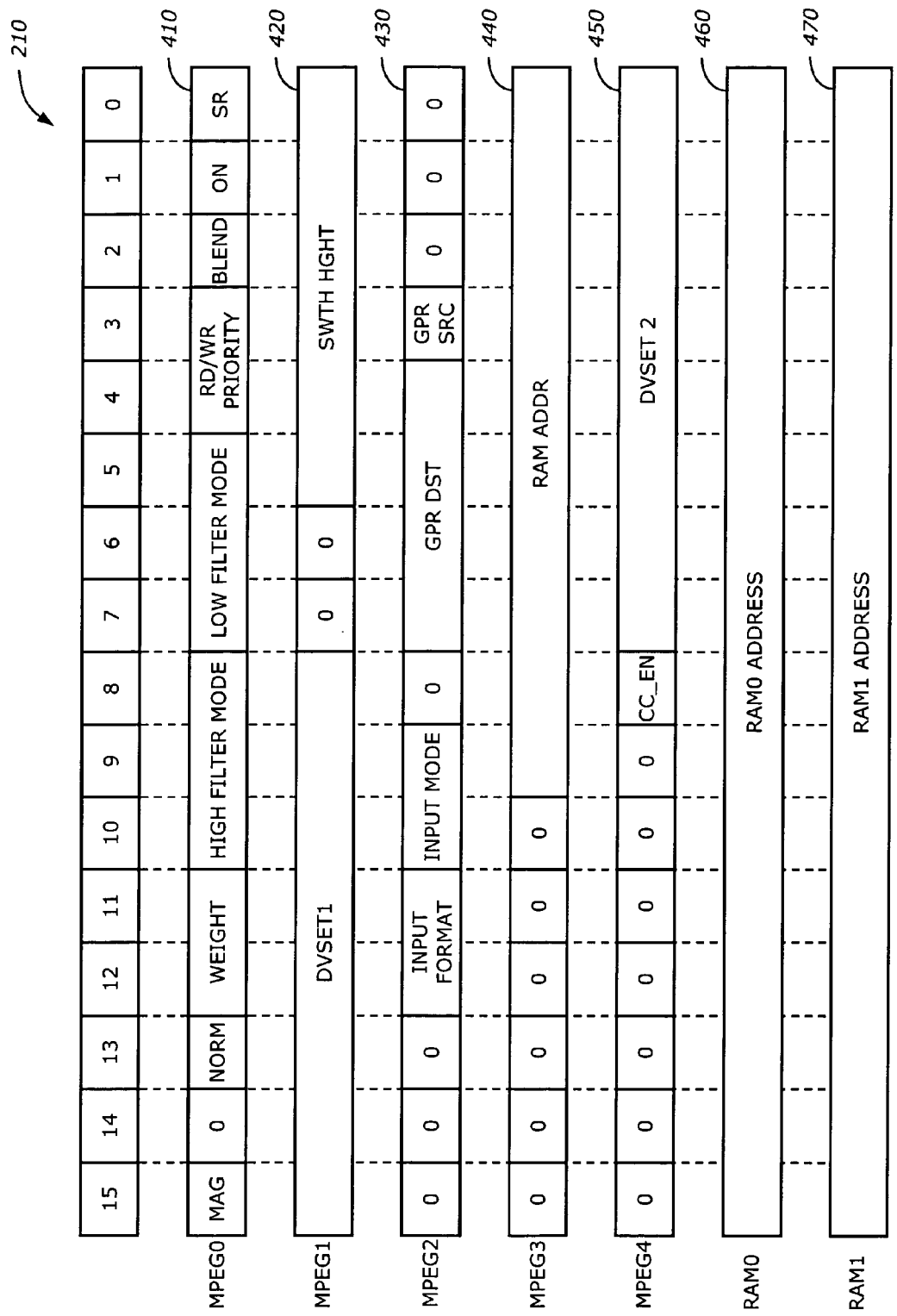
FIG. 4A is a diagram illustrating a set of programmable registers according to one embodiment of the invention.

FIG. 4A is a diagram illustrating the set of programmable registers 210 according to one embodiment of the invention. The set 210 includes a MREG0 410, a MREG1 420, a MREG2 430, a MREG3 440, a MREG4 450, a RAM0 460, and a RAM1 461. Each register is 16-bit and can be mapped into the address space of the host processor 150.

The MREG0 410 includes a normalization select (NORM), a weight, a high filter mode, a low filter mode, a read/write priority, a blend select, a power saving select (ON), and a reset (SR). The normalization select is used to set the filter output to be normalized or un-normalized. If the normalization is asserted, the normalized output is sent to the destination GPR. Otherwise, the un-normalized low filter output is sent to the destination GPR. The weight is used to define the blending weight. There are 4 blending types corresponding to two weight bits as shown in Table 2. The $F_L$ is the low filter output and the $F_H$ is the high filter output. The blend increments are basically multiples of 25%. For example, for a blend option of 01, the output is 75% of $F_L$ plus 25% of $F_H$.

TABLE 2

| Weight Bits | | Blending Function Performed |
|---|---|---|
| 0 | 0 | {$F_L$ * 4 + $F_H$ * 0} >> 2 |
| 0 | 1 | {$F_L$ * 3 + $F_H$ * 1} >> 2 |
| 1 | 0 | {$F_L$ * 2 + $F_H$ * 2} >> 2 |
| 1 | 1 | {$F_L$ * 1 + $F_H$ * 3} >> 2 |

The high filter mode bits select the filter implementation of the high filter unit and the low filter mode bits select the filter implementation of the low filter unit in the second filter 260 shown in FIG. 2. Each of the filters can either be dynamic or static depending on these mode bits. In one embodiment, the selection is shown in Table 3.

TABLE 3

| Low/High Filter Mode Bits | | | Filter Implemented |
|---|---|---|---|
| 0 | 0 | 0 | SRC |
| 0 | 0 | 1 | F3 |
| 0 | 1 | 0 | F5 |
| 0 | 1 | 1 | F7 |
| 1 | 0 | 0 | F9 |
| 1 | 0 | 1 | F11 |
| 1 | 1 | 0 | Reserved |
| 1 | 1 | 1 | Dynamic Bank Select |

The read/write priority bits determine the priority between the Read and Write in the RAM 230 shown in FIG. 2. The read/write bits are defined in Table 4.

TABLE 4

| RD/WR Priority Bits | | Priority Selected |
|---|---|---|
| 0 | 0 | Read has higher priority over Write |
| 0 | 1 | Write has higher priority over Read |
| 1 | 0 | Equal priority for Read and Write |
| 1 | 1 | Reserved |

If the Write has higher priority, then the RAM Write operation will go on until there is not enough space or no more data is available. Then, Read operation can occur. If the Read has higher priority then Writes are allowed only that much which is sufficient to sustain the read.

The Blend bit determines whether the second filter outputs are blended or not. The second filter 260 generates first and second filter outputs simultaneously. If the Blend bit is asserted, then the post processing unit 270 blends these two outputs together according to the bank select information and then normalized and sent to the destination GPR. If the Blend bit is negated, then both filter outputs are not blended and are sent directly to the destination GPR after normalization.

The power saving select bit stalls all the sub-units in the accelerator 120 when reset and the RAM goes into power saving mode. When this bit is switched on, the accelerator 120 resume its normal operation. The reset bit, SR, resets the entire accelerator 120.

The MERG1 420 includes DVSET1 and SWTH HGHT. The DVSET1 bits are used to set the CV bits of the destination GPR. The SWTH HGHT bits determine the swath height. The height can range from 1 to 64.

The MREG2 430 includes an input format, an input mode, a GPR DST select, and a GPR SRC select. The input format bits define whether the input pixel data is single component, two component, or three component format as shown in Table 5.

TABLE 5

| Input Format | | Component |
|---|---|---|
| 0 | 0 | Single component (i.e., L, L, L) |
| 0 | 1 | Two component (i.e., RG or BR) |
| 1 | 0 | Three component (i.e., Lab) |
| 1 | 1 | Reserved |

The input mode bit defines whether the input is in single column, dual column, or four column as shown in Table 6.

TABLE 6

| Input Format | | Column Mode |
|---|---|---|
| 0 | 0 | Single Column |
| 0 | 1 | Dual Column |
| 1 | 0 | Four Column |
| 1 | 1 | Reserved |

The GPR DST bits determine the general purpose register 280 into which the output of the post processing unit 270 is written. The GPR SRC bit determines which general purpose register is used as a source for the RAM 230.

The MREG3 440 stores the address from/to which the bus 215 reads/writes. After each access to the RAM 230 using the RAM ADDR, the address is incremented. The MREG4 450 stores the DV set bits to be used during column complete condition and the column complete enable (CC_EN) bit. At the end of a column processing, if the CC_EN bit is asserted, then the last output in a column is appended with the DVSET2 instead of DVSET1 (in MREG1 420). If the CC_EN bit is negated, then the DVSET1 is appended all the time.

RAM0 460 stores the data to be written to or read from the RAM0 bank in the RAM 230. RAM1 470 stores the data to be written to or read from the RAM1 bank of the RAM 230. The location of the RAM0/RAM1 bank is in the MREG3 440.

Figure 4B:
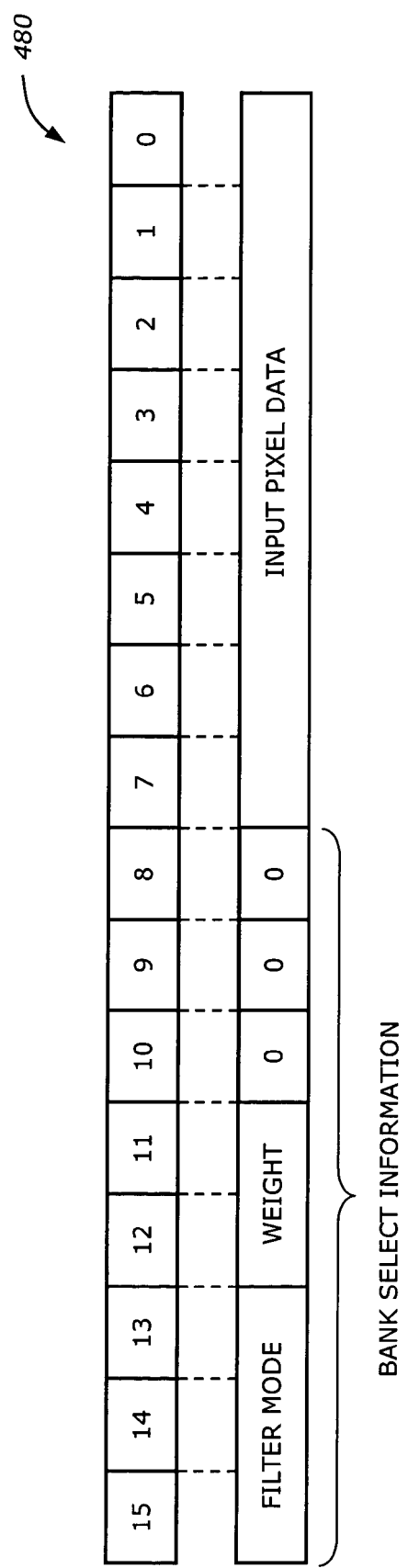
FIG. 4B is a diagram illustrating a format of the source GPR according to one embodiment of the invention.

FIG. 4B is a diagram illustrating a format 480 of the source GPR according to one embodiment of the invention. The format 480 includes the input pixel data and the bank select information.

The format 480 is the format of the source GPR as read into the RAM 230. The input pixel data occupy the lower 8 bits while the bank select information occupies the upper 8 bits. The bank select information includes the filter mode and the weight. The weight bits are used to determine the blending weight as shown in Table 2. The filter mode bits are used during the dynamic bank select mode where these bits determine the filters implemented. The dynamic bank select mode is selected by setting the filter mode bits in the MREG0 410 to "111" as shown in Table 3. There are two types of banks select modes: a static bank select mode and a dynamic bank select mode.

In the static bank select mode, each filter order (i.e., Low or High) is set to a specific Bank select and is left unchanged until the end of the swath. The bank select of each order (i.e., Low or High) is independent of each other. For example, a "F11" may be assigned to Lower order filter and "SRC" to Higher order filter. The bank select of each filter order is controlled by the Low filter mode and High filter mode bits in MREG0 410.

In the dynamic bank select mode, the filter mode supplied along with the Input data controls the filter implemented in Low/High filter. In this case the filter implemented varies with the input data. This is mode is selected by setting the filter mode bits in MREG0 410 as "111".

Each filter order in the accelerator 120 can operate either in static Bank select mode or dynamic Bank select mode. This results in 4 different scenarios as shown in Table 7.

TABLE 7

| Case Numbers | Low Order filter | High Order filter |
|---|---|---|
| 1 | Static Bank select mode | Static Bank select mode |
| 2 | Dynamic Bank select mode | Static Bank select mode |
| 3 | Static Bank select mode | Dynamic Bank select mode |
| 4 | Dynamic Bank select mode | Dynamic Bank select mode |

In case 1, both order filters are static. The filter implemented in Low and High order filter are independent of each other. The bank select of each filter order is controlled by the Low filter mode and High filter mode bits in MREG0 410. In case of Blend mode, since the lower order filter is static, the static weight bits defined in MREG0 410 are used.

In case 2, the Low order filter is in dynamic bank select mode, while the high order filter is in static mode. In this case, the filter implemented in the Low order filter varies with the input data supplied, while the high order filter remains the same throughout the swath. So, the filter implemented in Low and High order filter are independent of each other. In this case, the Low filter mode bits in MREG0 410 is set to "111" to operate in dynamic mode, while the static bank select used in High order filter is determined by High filter mode bits in MREG0 410. Table 8 shows the filter implemented in Lower order filter for different bit values of Filter mode bits [15:13] in the Input data. In case of Blend mode, since the lower order filter is dynamic, the dynamic weight bits supplied with the input data gets used.

TABLE 8

| Filter Mode bits in Input data [15:13 bits] | | | Lower order Filter Implemented |
|---|---|---|---|
| 0 | 0 | 0 | SRC |
| 0 | 0 | 1 | F3 |
| 0 | 1 | 0 | F5 |
| 0 | 1 | 1 | F7 |
| 1 | 0 | 0 | F9 |
| 1 | 0 | 1 | Reserved |
| 1 | 1 | 0 | Reserved |
| 1 | 1 | 1 | Reserved |

In case 3, the Low order filter is in static bank select mode, while the high order filter is in dynamic mode. In this case, the filter implemented in the High order filter varies with the input data supplied, while the high order filter remains the same throughout the swath. So, the filter implemented in Low and High order filter are independent of each other. In this case, the High filter mode bits in MREG0 410 is set to "111" to operate in dynamic mode, while the static bank select used in Low order filter is determined by Low filter mode bits in MREG0 419. Table 9 shows the filter implemented in Higher order filter for different bit values of Filter mode bits [15:13] in the Input data. Note the difference in filter implemented in Lower and Higher order filter for the same filter mode bits in Input data. In case of Blend mode, since the lower order filter is static, the weight bits defined in MREG0 410 are used.

TABLE 9

| Filter Mode bits in Input data [15:13 bits] | | | Higher order Filter Implemented |
|---|---|---|---|
| 0 | 0 | 0 | F3 |
| 0 | 0 | 1 | F5 |
| 0 | 1 | 0 | F7 |
| 0 | 1 | 1 | F9 |
| 1 | 0 | 0 | F11 |

TABLE 9-continued

| Filter Mode bits in Input data [15:13 bits] | | | Higher order Filter Implemented |
|---|---|---|---|
| 1 | 0 | 1 | Reserved |
| 1 | 1 | 0 | Reserved |
| 1 | 1 | 1 | Reserved |

In case 4, both High and Low filter order are in dynamic mode. In this case, the filter implemented in both High and Low order filter vary with the input data supplied. So, only in this case, the filter implemented in Low and High order filter are related to each other. For this case, both high and low filter mode bits in MREG0 410 are set to "111". Table 10 shows the filter implemented in Lower and Higher order filter for different bit values of Filter mode bits [15:13] in the Input data. In case of Blend mode, since the lower order filter is dynamic, the dynamic weight bits supplied with the input data are used.

TABLE 10

| Filter Mode bits in Input data [15:13 bits] | | | Lower order Filter Implemented | Higher order Filter Implemented |
|---|---|---|---|---|
| 0 | 0 | 0 | SRC | F3 |
| 0 | 0 | 1 | F3 | F5 |
| 0 | 1 | 0 | F5 | F7 |
| 0 | 1 | 1 | F7 | F9 |
| 1 | 0 | 0 | F9 | F11 |
| 1 | 0 | 1 | Reserved | Reserved |
| 1 | 1 | 0 | Reserved | Reserved |
| 1 | 1 | 1 | Reserved | Reserved |

FIG. 5 is a diagram illustrating the first filter 240 according to one embodiment of the invention. The first filter 240 includes an adder 510.

The adder 510 filters the data horizontally. It is a recursive adder which adds the two inputs together with the output to generate the partial filter output. Each filter output is available one after another in sequence after every clock cycle starting from Source (SRC), then F3, F5. F7, F9, and F11.

Suppose a row of data contains the following pixel from column number 1 through column number 32 in that order: L1, a1, L2, b1, L3, a2, L4, b2, L5, a3, L6, b3 L7, a4, L8, b4, L9, a5, L10, b5, L11, a6, L12, b6, L13, a7, L14, b7, L15, a8, L16, b8. The data sequences to be added are shown for three cases. The sequence pair 520 and 525 is for the L data having L7 as the center pixel. The sequence pair 530 and 535 is for the a4 as the center pixel. The sequence pair 540 and 545 is for b4 as the center pixel.

The first filter also sends the bank select information of the corresponding pixel to the register file 250.

Figure 6:
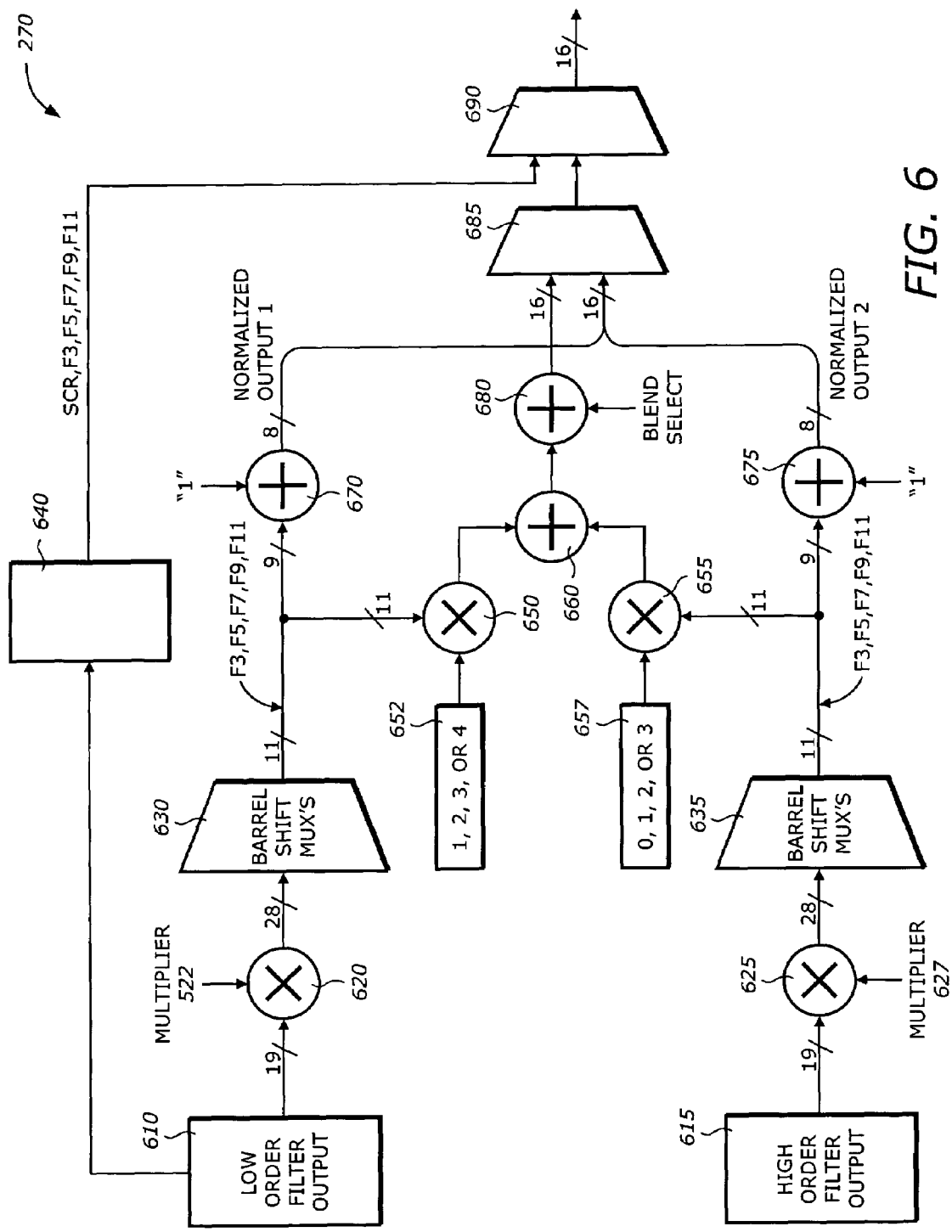
FIG. 6 is a diagram illustrating a post processing unit according to one embodiment of the invention.

FIG. 6 is a diagram illustrating the post processing unit 270 according to one embodiment of the invention. The post processing unit 270 includes multipliers 620 and 625, barrel shifter multiplexers 630 and 635, a register 640, multipliers 650 and 655, adders 660, 670, 675, and 680, and multiplexers 685 and 690.

The post processing operations include a normalization and a blending operation. In case of normalized data out, the lower and higher order filter outputs 610 and 615 are normalized by multiplying by multipliers 620 and 627 with suitable constants 522 and 527 depending on the filtering and then shifted appropriately by the barrel shifters 630 and 635 to get a 11 bit normalized data. The constants used are shown in Table 11. The normalized data is then interpolated together depending on the mode register MREG0 setup in the post data processing unit. For example, if the MREG0(2) is '1' then the 2 filter outputs from the second filter 260 are interpolated together; otherwise if it was '0', then both the filter outputs are sent out without interpolation. If the MREG0(2) is '1', then the two filter outputs coming from second filter of width 11 bits are interpolated depending on the Weight bits sent in the BNKSEL data i.e. BNKSEL (4:3). After interpolation the final output is unbiasingly rounded to 8-bits.

If the MREG0(2) is reset, then the two filter outputs of width 11 bits coming from the second filter 260 are unbiasingly rounded to 8 bits and packed together into 16-bit width output data with lower filter unit occupying the lower 8 bits and the higher order filter unit occupying the higher 8 bits and sent to the Destination GPR.

In case of un-normalized data out, the lower order filter output of width 19-bit is then suitably trimmed (depending on the filtering) to get a 16-bit output which is sent to the Destination GPR. The selection between Normalized and Un-normalized data out is done using the MREG0(13) bit.

After post processing, the filtered result is then appended with DV bits and then written into Destination GPR. The choice of which DV set is appended depends on the CC_EN bit in MREG4. When the last output in a column has to be written into GPR and if the CC_EN bit is set, then DVSET2 bits stored in MREG4 are appended. During all other cases, DVSET1 bits stored in MREG1 are appended. The toggling of DVSET bits is done so as to signal the PEs about the starting of a new column.

TABLE 11

| Filter Width | Fraction | Multiple | 8-bit Output |
|---|---|---|---|
| F3 | 1/16 | 1 | >>4 |
| F5 | 1/81 | 809 | >>16 |
| F7 | 1/256 | 1 | >>8 |
| F9 | 1/625 | 839 | >>19 |
| F11 | 1/1296 | 809 | >>20 |

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. An apparatus comprising:
    a first filter to process two-dimensional (2-D) data in a block of pixels in a first dimension for a plurality of filter sizes, the block having a swath;
    a register file coupled to the first filter to store the 2-D data based on programmable information; and
    a second filter coupled to the register file to filter the stored 2-D data in a second dimension to generate filter outputs in one of static and dynamic modes based on the programmable information, the static mode leaving the filter outputs fixed for the swath, the dynamic mode selecting the filter outputs on a pixel basis, the filter outputs including low and high order filter outputs.

2. The apparatus of claim 1 wherein the first filter comprises:
    an adder to add the data horizontally to generate partial filter outputs.

3. The apparatus of claim 1 wherein the second filter comprises:

a low order filter to generate the low order filter output; and a high order filter to generate the high order filter output; wherein the low and high order filters process the stored 2-D data in the second dimension and generate simultaneously the low and high order filter outputs, respectively.

4. The apparatus of claim 1 wherein the 2-D data are organized into a combination of one of a single component, dual component, and three component input format and one of a single column, dual column, and four column input mode according to the programmable information.

5. The apparatus of claim 3 wherein the filter sizes comprises a source size, a 3×3 size, a 5×5 size, a 7×7 size, a 9×9 size, and a 11×11 size.

6. The apparatus of claim 1 further comprising:
a set of programmable registers to provide the programmable information.

7. The apparatus of claim 1 further comprising:
a post processing unit to perform a post processing operation on at least one of the first and second filter outputs according to the programmable information.

8. The apparatus of claim 7 wherein the post processing operation is one of a normalization and a blending operation.

9. The apparatus of claim 8 wherein the programmable information includes at least one of a normalization select, a weight value for the blending operation, a high filter mode, a low filter mode, a read/write priority, a blend select, a power saving select, a reset select, appending data, a swath height, an input format, an input mode, a destination register, a source register, a memory address, and a memory data.

10. The apparatus of claim 1 further comprising:
a memory coupled to a source register to hold the 2-D data for the first filter; and
an address generator coupled to the memory to address the memory.

11. A method comprising:
processing two-dimensional (2-D) data in a block of pixels by a first filter in a first dimension for a plurality of filter sizes, the block having a swath;
storing the 2-D data in a register file based on programmable information; and
filtering the stored 2-D data in a second dimension by a second filter to generate filter outputs in one of static and dynamic modes based on the programmable information, the static mode leaving the filter outputs fixed for the swath, the dynamic mode selecting the filter outputs on a pixel basis, the filter outputs including low and high order filter outputs.

12. The method of claim 11 wherein processing by the first filter comprises:
adding the data horizontally to generate partial filter outputs.

13. The method of claim 11 wherein filtering by the second filter comprises:
processing the stored 2-D data in the second dimension; and
generating simultaneously the low and high order filter outputs by low and high order filters, respectively.

14. The method of claim 11 wherein processing the 2-D data comprises processing the 2-D data being organized into a combination of one of a single component, dual component, and three component input format and one of a single column, dual column, and four column input mode according to the programmable information.

15. The method of claim 13 wherein the filter sizes comprises a source size, a 3×3 size, a 5×5 size, a 7×7 size, a 9×9 size, and a 11×11 size.

16. The method of claim 11 further comprising:
providing the programmable information by a set of programmable registers.

17. The method of claim 11 further comprising:
performing a post processing operation on at least one of the low and high filter outputs by a post processing unit according to the programmable information.

18. The method of claim 17 wherein performing the post processing operation comprises performing one of a normalization and a blending operation.

19. The method of claim 18 wherein providing the programmable information comprises providing at least one of a normalization select, a weight value for the blending operation, a high filter mode, a low filter mode, a read/write priority, a blend select, a power saving select, a reset select, appending data, a swath height, an input format, an input mode, a destination register, a source register, a memory address, and a memory data.

20. The method of claim 11 further comprising:
holding the 2-D data for the first filter in a memory; and
addressing the memory using an address generator.

21. A system comprising:
a host processor;
a host bus; and
a media processor coupled to the host bus to receive two-dimensional (2-D) data in a stream of data, the media processor including an accelerator, the accelerator comprising:
a first filter to process the 2-D data in a block of pixels in a first dimension for a plurality of filter sizes, the block having a swath,
a register file coupled to the first filter to store the 2-D data based on programmable information, and
a second filter coupled to the register file to filter the stored 2-D data in a second dimension to generate filter outputs in one of static and dynamic modes based on the programmable information, the static mode leaving the filter outputs fixed for the swath, the dynamic mode selecting the filter outputs on a pixel basis, the filter outputs including low and high order filter outputs.

22. The system of claim 21 wherein the first filter comprises:
an adder to add the data horizontally to generate partial filter outputs.

23. The system of claim 21 wherein the second filter comprises:
a low order filter to generate the low order filter output; and
a high order filter to generate the high order filter output; wherein the low and high order filters process the stored 2-D data in the second dimension and generate simultaneously the low and high order filter outputs, respectively.

24. The system of claim 21 wherein the 2-D data are organized into a combination of one of a single component, dual component, and three component input format and one of a single column, dual column, and four column input mode according to the programmable information.

25. The system of claim 23 wherein the filter sizes comprises a source size, a 3×3 size, a 5×5 size, a 7×7 size, a 9×9 size, and a 11×11 size.

26. The system of claim 21 wherein the accelerator further comprises:

a set of programmable registers to provide the programmable information.

27. The system of claim 21 wherein the accelerator further comprises:
a post processing unit to perform a post processing operation on at least one of the low and high order filter outputs according to the programmable information.

28. The system of claim 27 wherein the post processing operation is one of a normalization and a blending operation.

29. The system of claim 28 wherein the programmable information includes at least one of a normalization select, a weight value for the blending operation, a high filter mode, a low filter mode, a read/write priority, a blend select, a power saving select, a reset select, appending data, a swath height, an input format, an input mode, a destination register, a source register, a memory address, and a memory data.

30. The system of claim 21 wherein the accelerator further comprises:
a memory coupled to a source register to hold the 2-D data for the first filter; and
an address generator coupled to the memory to address the memory.

* * * * *